(12) United States Patent
Mathewson et al.

(10) Patent No.: US 10,732,854 B2
(45) Date of Patent: Aug. 4, 2020

(54) RUNTIME CONFIGURATION OF A DATA PROCESSING SYSTEM

(71) Applicant: Arm Limited, Cambridge (GB)

(72) Inventors: Bruce James Mathewson, Papworth Everard (GB); Carlos Garcia-Tobin, Ely (GB); Phanindra Kumar Mannava, Austin, TX (US); Thanunathan Rangarajan, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/977,153

(22) Filed: May 11, 2018

(65) Prior Publication Data

US 2019/0347011 A1    Nov. 14, 2019

(51) Int. Cl.
| | |
|---|---|
| *G06F 13/00* | (2006.01) |
| *G06F 13/36* | (2006.01) |
| *G06F 3/06* | (2006.01) |
| *G06F 13/362* | (2006.01) |
| *G06F 9/4401* | (2018.01) |

(52) U.S. Cl.
CPC .......... *G06F 3/0613* (2013.01); *G06F 3/0647* (2013.01); *G06F 3/0673* (2013.01); *G06F 9/4401* (2013.01); *G06F 13/362* (2013.01)

(58) Field of Classification Search
CPC ................................ G06F 13/00; G06F 13/36
See application file for complete search history.

(56) References Cited

U.S. PATENT DOCUMENTS

| | | | | |
|---|---|---|---|---|
| 2005/0021530 A1* | 1/2005 | Garg | ....................... | G06F 9/505 |
| 2006/0104199 A1* | 5/2006 | Katukam | ................ | H04L 12/43 |
| | | | | 370/216 |
| 2008/0091740 A1* | 4/2008 | Le Merrer | ............ | H04L 67/104 |
| 2015/0052179 A1* | 2/2015 | Novick | ................. | G06F 16/183 |
| | | | | 707/827 |

* cited by examiner

*Primary Examiner* — David E Martinez
(74) *Attorney, Agent, or Firm* — Nixon & Vanderhye P.C.

(57) ABSTRACT

A data processing system and a method of runtime configuration of the data processing system are disclosed. The data processing system comprises a plurality of home nodes, and for a data store associated with a slave node in the data processing system, for each home node of the plurality of home nodes a modified size of the data store is determined. The modified size is based on a storage capacity of the data store and at least one additional property of the data processing system. A chosen home node of the plurality of home nodes is selected which satisfies a minimization criterion for the modified size, and the chosen home node is paired with the slave node.

19 Claims, 5 Drawing Sheets

RUNTIME CONFIGURATION OF A DATA PROCESSING SYSTEM

BACKGROUND

Technical Field

The present technique relates to the field of data processing.

Technical Background

In a system of multiple interconnected devices, the devices can include slave nodes, home nodes and request nodes. Each slave node is associated with a data store and directly manages accesses to that data store, while home nodes manage the coherency of memory accesses in the system. Request nodes are processing elements which generate memory access requests, the memory access requests being communicated to the relevant slave node via a home node. A home node can be bound to multiple slave nodes, and a slave node can be bound to multiple home nodes. In conventional systems, there is a fixed relationship between the home nodes and the slave nodes.

SUMMARY

Viewed from one aspect, the present technique provides a method of runtime configuration of a data processing system comprising a plurality of home nodes, the method comprising:
for a data store associated with a slave node in the data processing system, determining for each home node of the plurality of home nodes a modified size of the data store, the modified size being based on a storage capacity of the data store and at least one additional property of the data processing system;
selecting a chosen home node of the plurality of home nodes which satisfies a minimization criterion for the modified size; and
pairing the chosen home node with the slave node.
Viewed from another aspect, the present technique provides a data processing system comprising:
a plurality of home nodes;
a data store associated with a slave node;
runtime configuration circuitry arranged to perform a runtime configuration of the data processing system comprising:
determining for each home node of the plurality of home nodes a modified size of the data store, the modified size being based on a storage capacity of the data store and at least one additional property of the data processing system; and
selecting a chosen home node of the plurality of home nodes which satisfies a minimization criterion for the modified size and to pair the chosen home node with the slave node.
Viewed from another aspect, the present technique provides a data processing system comprising:
a plurality of home node means;
data storage means associated with slave node means;
means for performing a runtime configuration of the data processing system comprising:
means for determining for each home node means of the plurality of home node means a modified size of the data storage means, the modified size being based on a storage capacity of the data storage means and at least one additional property of the data processing system; and
means for selecting a chosen home node means of the plurality of home node means which satisfies a minimization criterion for the modified size and to pair the chosen home node means with the slave node means.

Further aspects, features and advantages of the present technique will be apparent from the following description of examples, which is to be read in conjunction with the accompanying drawings.

DESCRIPTION OF EXAMPLES

Figure 1:
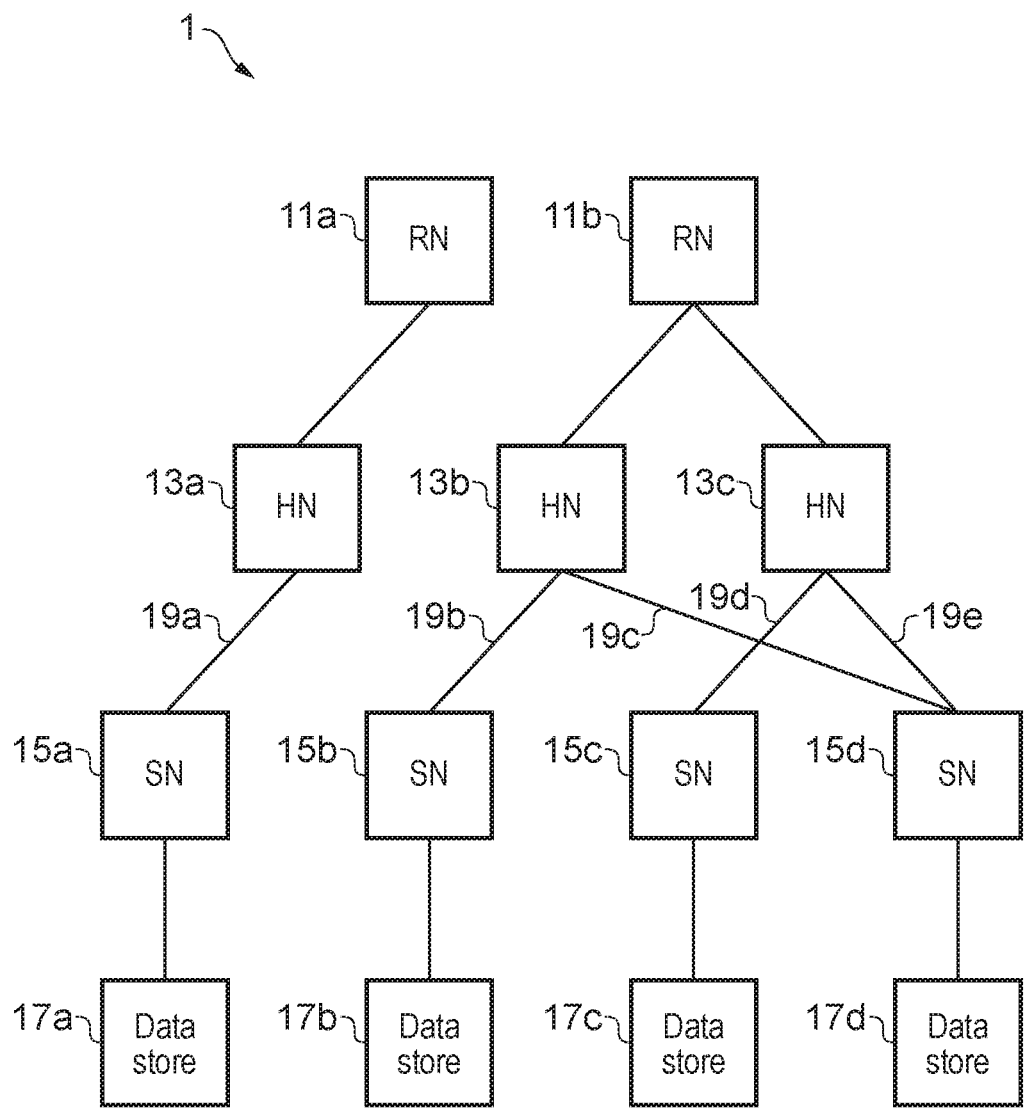
FIG. 1 is a block diagram showing a data processing system according to the present technique.

The present technique describes a method of configuring a data processing system, in which a home node (also known as a home agent) is chosen for pairing with a particular slave node (slave agent). The slave node is an element in the data processing system which controls memory accesses to a data store associated with the slave node, where the data store can consist of any type of memory. For example, the memory can be volatile memory, such as dynamic random-access memory (DRAM) or static random-access memory (SRAM), or non-volatile memory, such as read-only memory (ROM) or flash memory. A home node is a processing element within the data processing system which is configured to maintain the coherency of data stored in multiple locations within the system. That is, if multiple copies of some data are stored across multiple locations, such as in multiple data caches, or if multiple requests to the same data location are received at home from different request nodes, the home node is configured to ensure that the data is consistent across all locations. The home node is also involved in the serialization of accesses to data in the system.

In configuring the system, a slave node is paired with (bound to) a home node, such that memory access requests for data stored in the data store associated with that slave node are routed via a home node that is paired with the slave node. The method of the present technique involves calculating, for each home node in the system, a modified size of the data store associated with the slave node. The modified size is dependent on the home node for which it is calculated, and is the same as or larger than the physical size (storage capacity) of the data store. The modified size is based on the storage capacity of the data store, modified in dependence on at least one additional property of the data processing system. A home node can then be selected based on this modified size, where a home node which satisfies a minimization criterion is chosen for pairing with the slave node. The slave node and the chosen home node are then paired.

The present technique thus provides a dynamic arrangement of home nodes and slave nodes in which, rather than relying on fixed relationships between home nodes and slave nodes, an optimized pairing can be selected when the data processing system is configured. This allows factors such as the efficiency of the system to be improved.

By defining the modified size based on properties of the data processing system, such properties, in addition to the storage capacity of the data store, can be taken into account when selecting a home node to pair with the slave node. This allows an optimized pairing between an available home node and the slave node to be achieved based on one or multiple properties of the data processing system.

An example of an additional property on which the modified size of the data store can be based is the size of a memory container of a home node. A memory container is defined for each home node, where the size of the memory container indicates the size of a data store that the home node is capable of addressing, and indicates the amount of memory the home node is capable of monitoring or maintaining the coherence of.

A home node with a memory container smaller than the size of a data store controlled by a slave node is not suitable for pairing with that slave node, due to there being part of the data store which it can't address. Thus, by basing the modified size of the data store on the size of the memory container of a home node, it can be ensured that only a home node with sufficient capacity is chosen for pairing with the slave node.

In some examples, the difference between the storage capacity of the data store and the size of the memory container is calculated. If the size of the memory container of the home node is significantly bigger that the size of a data store, pairing the home node with the slave node associated with that data store could be wasteful, and so basing the modified size on the difference between the two allows this potential issue to be taken into account, allowing for the efficiency of the system to be improved.

Another example of a property of the data processing system which could contribute to the modified size of the data store is the number of independent transmission paths, or the number of "hops", between the home node and the slave node. The number of independent transmission paths refers to the number of times a data transmission has to be transferred between one element and another in the system to get from the home node to the slave node; this is described in more detail below, with reference to the figures.

By basing the modified size on the number of independent transmission paths between the home node and the slave node, the time and processing power required to transmit data or a memory access request between the two is taken into account. Thus, in finding a modified size that satisfies a minimization criterion, the time and processing power required can also be reduced, improving the overall efficiency of the data processing system. This can also be taken into account by considering the transmission distance between the request node and the data source.

Another example of a property of the data processing system on which the modified size can be based is the quality of a link between the home node and the slave node, where the link is a connection between the home node and the slave node, for example, this could be a link between two processing units. In this way, the link quality can be taken into account when choosing a home node. The quality of the link can be defined in terms of transmission error rate on the link, where a higher transmission error rate indicates a greater number of link retries, thus increasing power utilization, reducing effective link throughput, and increasing average latency for completion of transmissions. The quality can also be defined in terms of the width of the link (e.g. the number of wires in the link), the speed on the link (e.g. frequency of transmission), or the physical length of the link, where longer the length, the higher the power utilization or lower the frequency of transmission.

The quality of the link can, for example, be determined in dependence on the bandwidth of the link. This allows for the bandwidth of the connection between the home node and the slave node to be taken into account when choosing a home node.

The link between the home node and the slave node may comprise a token-based arbitration system, where tokens or credits are allocated to a home node for use of the link, and transmissions between a home node using the link and a slave node are based on the number of tokens allocated to a home node. Thus, the quality of the link between the home node and the slave node is, in some examples, determined based on the number of tokens available.

In this way, the quality of a data transmission between a given home node and the slave node is taken into account when choosing a home node, and thus the speed at which data accesses to the slave node are carried out can be taken into account when choosing a home node.

Properties of the data processing system can be used in determining the modified size in any way, an example of which is by multiplying the storage capacity of the data store by one or more values derived from the property or properties of the system. Examples of such multiplications will be given below.

Calculating the modified size as a multiplication of values derived from properties of the data processing system provides a simple method of determining the modified size. It can therefore be easily determined whether a modified size satisfies the minimization criterion, reducing the processing power required to perform this determination and reducing the complexity of the hardware necessary to implement the method. Nevertheless, other techniques for calculating the modified size are also contemplated, such as addition of the values derived from the properties of the data processing system or multiplication of weighted values as discussed below.

In some examples, the one or more values derived from the properties of the data processing system may be weighted depending on a predetermined relative importance of the property or properties on which the values are based. In this way, the properties can be prioritised in dependence on their relative importance, as determined by a user or programmer. This allows the configuration of the data processing system to be tailored to the individual needs of the system.

In some examples, the minimization criterion for the modified size is satisfied by the home node for which the modified size is the smallest. In other words, the minimization criterion is satisfied when the modified size is as close as possible to the storage capacity of the data store. This provides an easy measure of the optimization of a given pairing between the slave node and a home node, allowing the chosen home node to be selected using minimal processing power, reducing the complexity of the hardware necessary to implement the method.

In some examples, the minimization criterion can only be satisfied by a home node when the memory type of the data store is compatible with the memory access circuitry of the home node. For example, a home node with memory access circuitry designed to access volatile memory may not be able to administer a cache coherency protocol for data stored in a non-volatile data store, and vice versa. In other examples, a home node with memory access circuitry configured to access a specific type of volatile or non-volatile memory (e.g. DRAM) may only be able to administer a cache coherency protocol for data stored in a data store of the same specific type (DRAM, in this example). As such, only allowing the minimization criterion to be satisfied for home node/slave node pairs with compatible memory types prevents pairing of incompatible home nodes and slave nodes.

In some examples, following the pairing of the chosen home node with the slave node, a further chosen home node can be selected to be paired with the same slave node. A slave node can be paired with more than one home node, so in some examples it is advantageous to be able to select a further home node which satisfies a minimization criterion for a further modified size, calculated based on the storage capacity of the data store and at least one other property of the data processing system, and to pair the further home node with the slave node. This allows a plurality of home nodes to be paired to a given slave node which, in some cases, provides a more flexible solution than if each slave node were only permitted to pair with a single home node.

In some examples, following the pairing of a slave node and a chosen home node, the runtime configuration method is run again for another slave node, such that a suitable pairing between the new slave node and a home node can be found. In this case, a modified size of this new data store is determined for each home node. A home node which satisfies a minimization criterion for the further modified size is then selected. In this way, the slave nodes of the data processing system can be systematically paired using, for example, a bin-packing algorithm, allowing a preferred solution for the pairing of all of the home nodes and slave nodes to be found.

In some examples, the home node selected to be paired with the further slave node may be the chosen home node (that is the home node already selected to be paired with the original slave node). A home node can be paired with more than one slave node, so in some examples the home node chosen to pair with the original slave node is included in the calculation of modified sizes and the selection of the home node that satisfies the minimization criterion. This allows a plurality of slave nodes to be paired to a given home node, which, in some cases, provides a more flexible solution than if each home node were only permitted to pair with a single slave node.

The data processing system itself consists of a plurality of home nodes (home agents), each configured to, among other things, monitor the coherency of data accesses within the system, at least one data store associated with at least one slave node (slave agent) and runtime configuration circuitry, arranged to pair a slave node with a chosen home node according to the configuration method described above. The home nodes and slave nodes are processing elements in the data processing system and the data store can comprise any type of memory, including volatile memory such as DRAM or SRAM and non-volatile memory such as ROM or flash memory.

In some examples, the runtime configuration circuitry is part of one of the processing elements of the system, where the processing element can be a home node, a slave node, a request node or any other processing element in the system.

This allows the runtime configuration method described to be implemented without requiring an additional hardware component to carry out the method.

In some examples, the runtime configuration method described is carried out in response to at least one of:

the chosen home node being disconnected—this could be that the chosen home node is powered off or physically disconnected from the system, or it may develop a fault;

the slave node being disconnected—likewise, this could be that the slave node is powered off or physically disconnected from the system, or it may develop a fault;

a further slave node being added to the data processing system;

a further home node being added to the system; and the data processing system being rebooted (e.g. powered off and powered back on again).

In this way, the relationship between home nodes and slave nodes in the data processing system is dynamic, such that the number and arrangement of processing elements in the system can easily be adjusted without adverse effects.

Particular embodiments of the technique will now be described with reference to the accompanying figures.

FIG. 1 shows a simplified schematic view of a data processing system 1 according to the present technique, comprising a plurality of request nodes 11, a plurality of home nodes 13 and a plurality of slave nodes 15, each associated with a data store 17. Each data store 17 is memory capable of storing data, and can be of any type—for example DRAM, SRAM, ROM, flash memory or any other type of volatile or non-volatile data storage. Each data store 17 is associated with a slave node 15, which is configured to control data accesses to the data store 17, where a data access can include reading a data value stored in the data store or writing a data value to the data store, for example. In FIG. 1, data store 17a is associated with slave node 15a, such that slave node 15a controls memory accesses to data store 17a. Similarly, data store 17b is associated with slave node 15b, data store 17c is associated with slave node 15c and data store 17d is associated with slave node 15d. Although four data stores 17 and four slave nodes 15 are shown in FIG. 1, it will be appreciated that any number of data stores 17 or slave nodes 15 can be included in the data processing system 1.

The home nodes 13 manage the coherency of data stored in memory locations throughout the data processing system 1, according to a defined coherency protocol. Copies of data stored in a data store 17 can be stored in additional locations in the data processing system 1, such as in data caches (not shown). One role of the home nodes 13 is to monitor accesses to the data stores 17 and maintain the coherency of the data stored in the data stores 17. Each memory access request to be processed by one of the slave nodes 15 is therefore routed via one of the home nodes 13, where each home node 13 is bound to (paired with) one or more slave nodes 15, and each slave node 15 is bound to (paired with) one or more home nodes 13. Each home node 13 includes memory access circuitry which is capable of processing and monitoring the coherency of data access requests relating to memory of a given type—for example, the memory access circuitry could be compatible with only volatile data stores, or only non-volatile data stores or, in other examples, the memory access circuitry is only compatible with a specific memory type, such as DRAM or flash memory. As a result, some home nodes 13 are incompatible with some slave nodes 15, due to the type of memory in the data store 17 associated with the slave node 15. Accordingly, it is beneficial to avoid pairing home nodes 13 and slave nodes 15 which are incompatible, or at least may work inefficiently together.

Memory access requests are generated by processing elements known as request nodes or request agents 11. These include any processing element configured to generate a memory access request. For example, request node 11a could generate a read request relating to data stored in data store 17a. The read request is then transferred to home node 13a, which passes on the read request to slave node 15a. Slave node 15a then accesses the memory location referenced by the read request and sends a copy of the data stored at that location to a location specified by the read request.

Links 19 are shown between nodes or processing elements in the data processing system 1. Although the links 19 are shown in FIG. 1 as direct links between nodes, in some examples they comprise multiple independent transmission pathways (hops), as described in greater detail below, with reference to FIG. 2.

Figure 2:
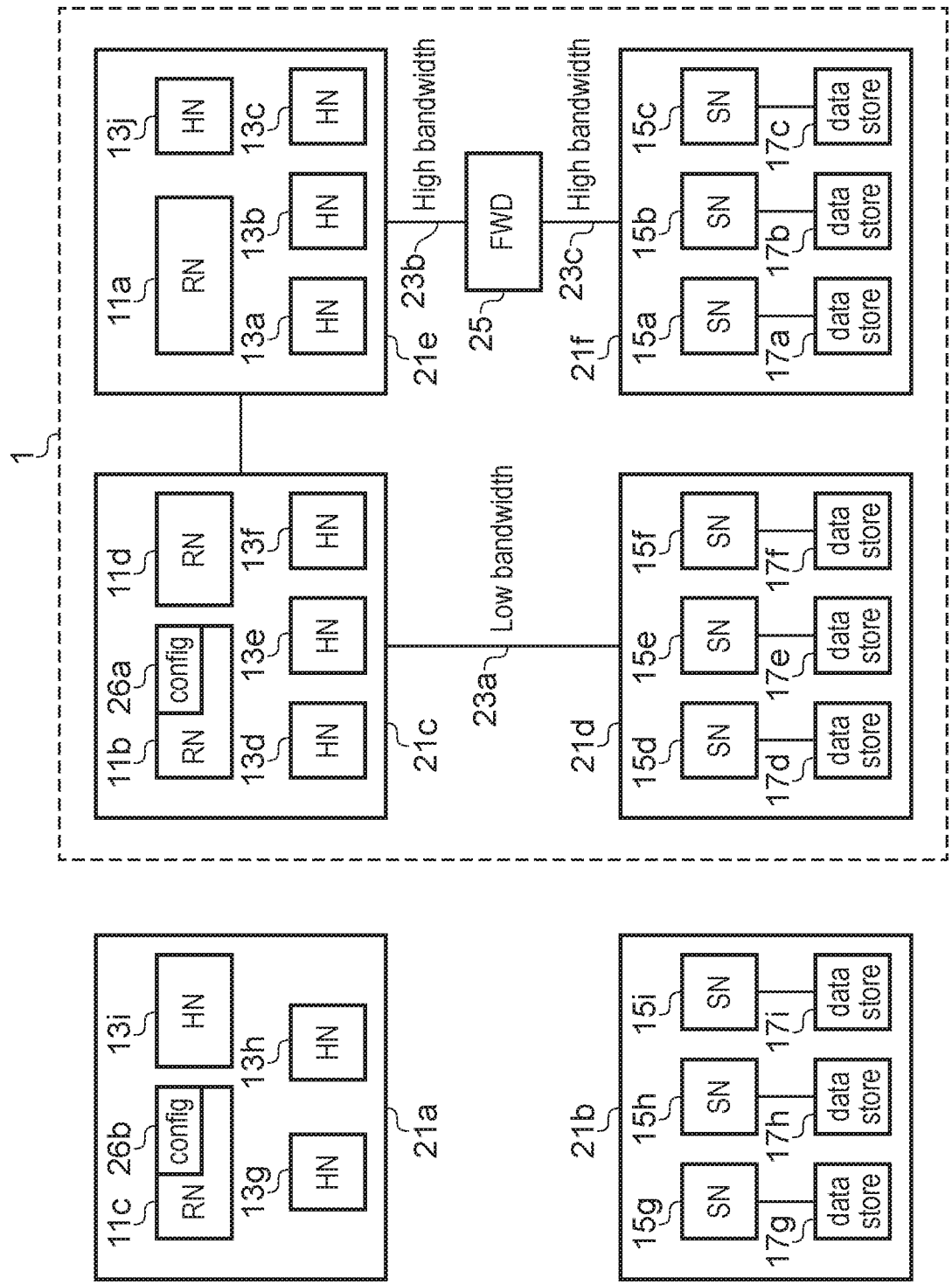
FIG. 2 is a block diagram showing a data processing system according to the present technique.

FIG. 2 shows a data processing system 1 in an example embodiment according to the present technique. The request nodes 11, home nodes 13, slave nodes 15 and data stores 17 are arranged in processing units 21. The processing units 21 can be fixed or removable—for example, two of the processing units 21a, 21b are not connected to the data processing system 1, but may be connected at a later stage. Three of the processing units 21a, 21c, 21e include request nodes 11 and home nodes 13, while the other three processing units 21b, 21d, 21f include slave nodes 15 and data stores 17. The processing units 21c to 21f in the data processing system 1 are connected via connections 23, which can be wired connections or wireless connections, and can be direct connections or may pass via a memory bus (not shown). Unlike the links 19 shown in FIG. 1, the connections 23 are fixed, and each can make up one of the hops or independent transmission paths of a link 19 between a home node 13 and a slave node 15. For example, in FIG. 1, home node 13a is paired with slave node 15a via link 19a. As shown in FIG. 2, the link 19a between home node 13a, in processing unit 21e, and slave node 15a, in processing unit 21f, comprises two independent transmission paths—connection 23b, between processing element 21e and the forwarding node 25, and connection 23c, between the forwarding node 25 and processing element 21f. The number of independent transmission paths in a link between a home node 13 and a slave node 15 can therefore be considered in terms of the number of connections 23 between the home node 13 and the slave node 15. In some examples, it is useful to minimize the number of hops or independent transmission paths in a link 19 between a home node 13 and a slave node 15, in order to improve the overall efficiency of the system. In other examples, however, other factors such as the bandwidth of the connections 23 are more important in maximising the efficiency of the system.

The connections 23 can be high bandwidth connections—such as connections 23b and 23c—or lower bandwidth connections—such as connection 23a. In some examples, a link 19 with a higher bandwidth is preferable over a link 19 with a lower bandwidth, even if the link 19 with a higher bandwidth comprises a greater overall number of independent transmission paths. In other examples, the opposite is true, and it is more beneficial to form a link 19 with a smaller overall number of independent transmission paths. In either case, it is beneficial to take into account the bandwidth of connections 23 when pairing slave nodes 15 and home nodes 13, in order to improve the efficiency of the data processing system 1.

The forwarder node 25 can, for example, be any processing element which is not a request node 11, home node 13 or slave node 15.

Some request nodes 11b and 11c include configuration circuitry 26. The configuration circuitry 26 is configured to perform a runtime configuration method to find an optimized pairing between home nodes 13 and slave nodes 15. The configuration circuitry 26 performs the runtime configuration method whenever the data processing system 1 is rebooted. The configuration circuitry 26 also performs the runtime configuration method when a processing unit 21 is added to or removed from the data processing system 1, or when a processing unit 21 is powered off or powered on. The runtime configuration method is described in more detail below, with reference to FIG. 4. It is not necessary for all request nodes 11 to include runtime configuration circuitry, for example request node 11d does not include runtime configuration circuitry.

Although the connections 23 between processing units 21 are described here as static, the links 19 between the home nodes 13 and request nodes 15 are not. Any home node 13 can be paired with any slave node 15, allowing an optimized pairing of home nodes 13 and slave nodes 15 to be selected. In this way, if a new processing unit 21a or 21b is added to the data processing system 1—for example by plugging in a USB flash drive—the configuration circuitry 26 performs the runtime configuration method to find optimized pairings between any home nodes 13 or slave nodes 15 in the new processing unit 21a or 21b and home nodes 13 or slave nodes 15 already in the data processing system 1. This allows a dynamic configuration of the data processing system 1 to be maintained, allowing for greater freedom in pairing home nodes 13 and slave nodes 15, such that the flexibility and dynamism of the system can be improved.

Figure 3:
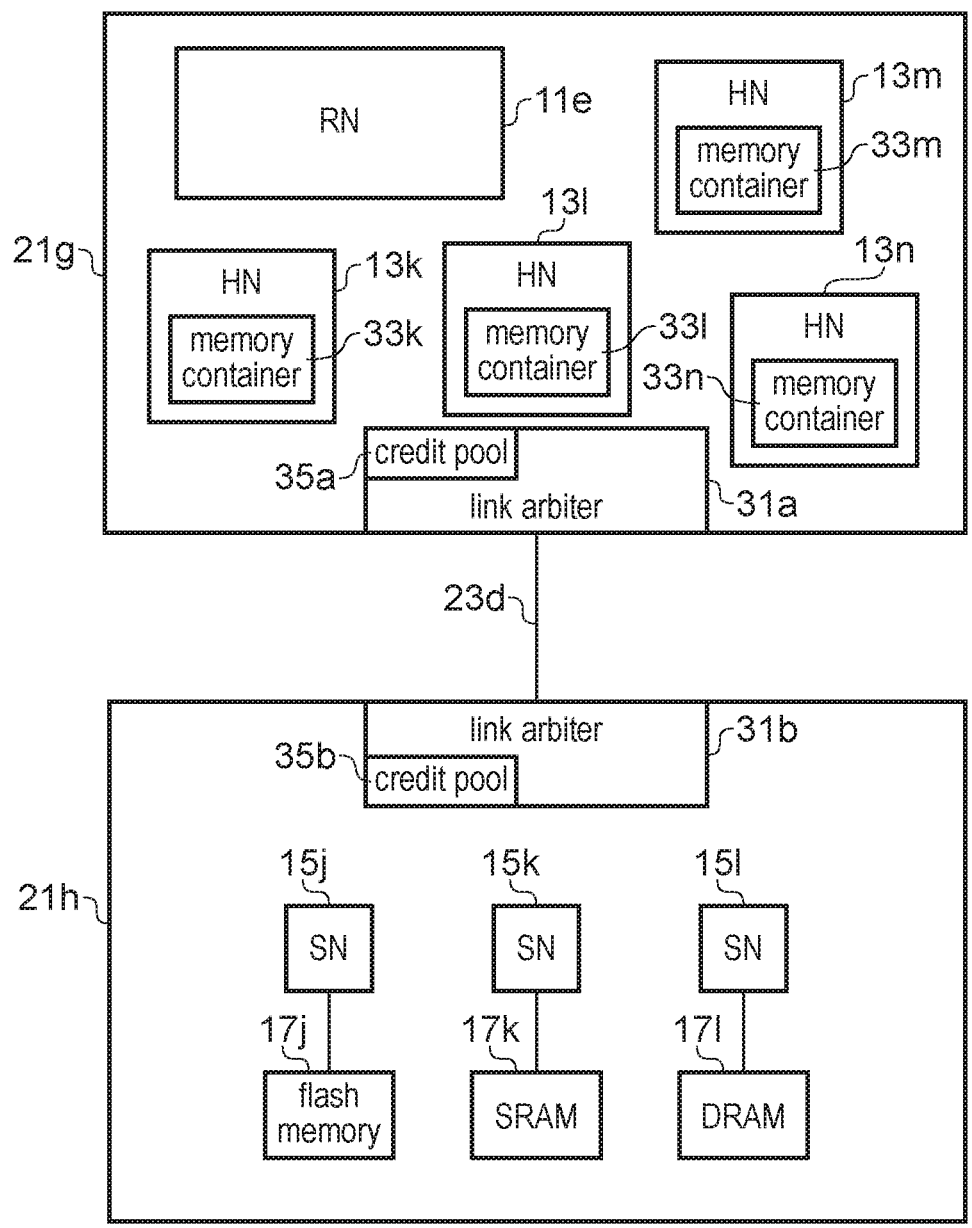
FIG. 3 is a block diagram showing a data processing system according to the present technique.

FIG. 3 shows an example of two processing units 21 connected via a connection 23d. One processing unit 21g comprises four home nodes 13k, 13l, 13m and 13n, a request node 11e and a link arbiter 31a. The other processing unit 21h comprises three slave nodes 15j, 15k, 15l associated with three data stores 17j, 17k, 17l, and a link arbiter 31b. In the example of FIG. 3, the data stores 17j, 17k, 17l comprise flash memory, SRAM and DRAM respectively although any other type of memory could also be used.

Each data store 17 has a size, which is the storage capacity, or the amount of data that can be stored to the data store 17. Each home node 13 has a memory container 33. The memory container 33 (also referred to as a memory pool) is defined as a memory size which the respective home node 13 is capable of accessing, and decreases in size each time a slave node 15 is paired with the home node 13. In other words, the total memory size of all the data stores 17 to which a given home node 13 is paired (via their respective slave nodes 15) should not exceed the total size of the memory container 33, or else the home node 13 will not be able to effectively administer a cache coherency protocol for the data stored in those data stores 17. On the other hand, it is beneficial to make use of as much of the memory container 33 as possible, and so in some examples, if there is a large difference between the size of the memory pool 33 and the size of a data store 17 associated with a slave node 15, it is not appropriate to bind that home node 13 with that slave node 15. In other examples, it may be beneficial to pair the two, for example if a second slave node 15 can also be paired with the same home node 13, such that the combined size of the data stores 17 associated with the two slave nodes 15 is close to the size of the memory container 33 of the home node 13. In either case, it is useful to take into account the size of the memory container 33 when selecting a home node 13 to pair with a given slave node 15.

Each processing unit 21 includes a link arbiter 31, which uses a token-based arbitration system to arbitrate the connection 23d between the processing units 21g, 21h. In a token-based arbitration system, each home node 13 is allocated a number or tokens or credits from a credit pool 35 (e.g. a maximum number of credits/tokens available for allocation to home nodes 13 by the link arbiter 31), and data transmissions sent via the connection 23d are arbitrated in dependence on the number of credits held by the home node 13 sending the data transmission. Similarly, each slave node 15 is allocated a number of tokens by the link arbiter 31b, and data transmissions from the slave nodes 15 are arbitrated in a similar way. In some examples, the arbitration is such that data transmissions from the home node 13 (or the slave node 15, for data transmissions in the opposite direction) with the highest number of credits or tokens are prioritised over data transmissions from the other home nodes 13 (or slave nodes 15). In other examples, it is the node with the fewest link credits which is prioritised. In either case, the number of link tokens held by a given home node 13 is a factor in the overall speed of data transmissions from that home node 13, and so it could be beneficial to take the number of link tokens into account when choosing a home node 13 for pairing with a given slave node 15.

Figure 4:
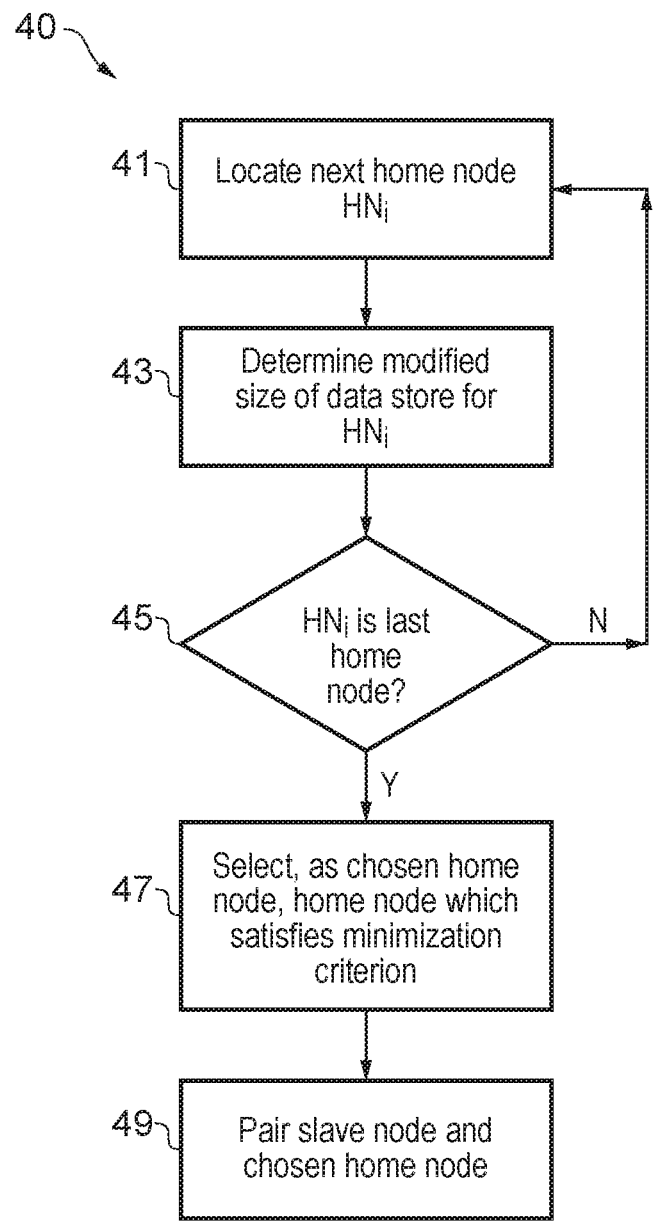
FIG. 4 is a flow diagram of a runtime configuration method according to the present technique.

FIG. 4 is a flow diagram showing a runtime configuration method 40 for selecting a home node 13 to pair with a given slave node 15, according to the present technique. The runtime configuration method 40 is performed by the configuration circuitry 26. In step 41, the next home node 13 (HNi) is located. The next home node 13 may be chosen in a variety of ways, for example it could be chosen at random, it could be the next home node 13 identified by the configuration circuitry 26, it could be the next closest home node 13, it could be the next home node 13 in a predetermined sequence, or it could be any other home node 13. In any case, once the next home node 13 has been located, the method proceeds to step 43. In step 43, the modified size of the data store 17 associated with the given slave node 15 is determined for the selected home node 13. The modified size is based on the storage capacity of the data store 17 and at least one other property of the data processing system 1 and is not necessarily the same for all home nodes 13. In some examples, the at least one additional property of the data processing system 1 could be the size of the memory container 33 of the selected home node 13, the number of hops or independent transmission paths between the given slave node and the selected home node 13 or the quality of the link 19 between the given slave node and the selected home node 13, where the quality of the link 19 is determined based on, for example, the bandwidth of the connections 23 in the link 19, or the number of link credits available to the home node 13. Example methods of calculating the modified size of the data store 17 are given below.

In some examples, the modified size of the data store 17 may be calculated as a multiplication of the following values:

A—the difference in size between the memory container 33 of the home node 13 and the size of the data store 17;

B—the number of independent transmission paths in the link 19 between the home node 13 and the slave node 15

C—the quality of the link 19 between the home node 13 and the slave node 15, where the quality C is determined based on the bandwidth of the connections 23 in the link 19 and the number of credits available to the home node 13.

In some examples, the modified size Q of the data store 17 for the selected home node 13 (HNi) is therefore given by:

$$Q=A*B*C*P$$

where P is the storage capacity of the data store 17.

In some examples, only some of the values A to C will be included in the calculation, while in other examples additional properties are also considered. In some examples, the values A to C are each multiplied by a scaling factor a, b or c, based on the relative importance of that factor, as determined by a user of the data processing system 1 or by a programmer. In this case, the modified size Q can, for example, be given by:

$$Q=aA*bB*cC*P.$$

Other methods of calculating the modified size Q based on properties of the data processing system 1 can also be employed, such as any of the following examples:

$$Q=A+B+C+P$$

$$Q=aA+bB+cC+P$$

$$Q=(A+B+C)*P$$

$$Q=(aA+bB+cC)*P$$

The programmer is free to choose any method of calculating the modified size based on the properties of the data processing system 1, depending on the requirements of the user of the data processing system 1.

Returning to FIG. 4, once the modified size of the data store 17 for the selected home node 13 has been determined in step 43, the method proceeds to step 45. In step 45, a determination is made of whether the selected home node 13 (HNi) is the last home node in the system, that is whether or not there are any other home nodes 13 for which a modified size of the data store 17 has not been calculated. If the selected home node 13 is not the last home node, the method returns to step 41, and the next home node is located. On the other hand, if the selected home node 13 is determined to be the last home node, the method instead proceeds to step 47. In step 47, the home node 13 which satisfies a minimization criterion is selected as the chosen home node.

In some examples, the minimization criterion is satisfied by the home node 13 for which the modified size Q of the data store 17 is the smallest, although the programmer is free to set any minimization criterion for the modified size, depending on the individual needs of the user.

Once a chosen home node 13 has been selected, the method proceeds to step 49, in which the slave node 15 and the chosen home node 13 are paired.

The runtime configuration method 40 of the present technique therefore allows an optimized pairing to be found for a given slave node 15, such that the efficiency of the data processing system 1 can be maximized.

Figure 5:
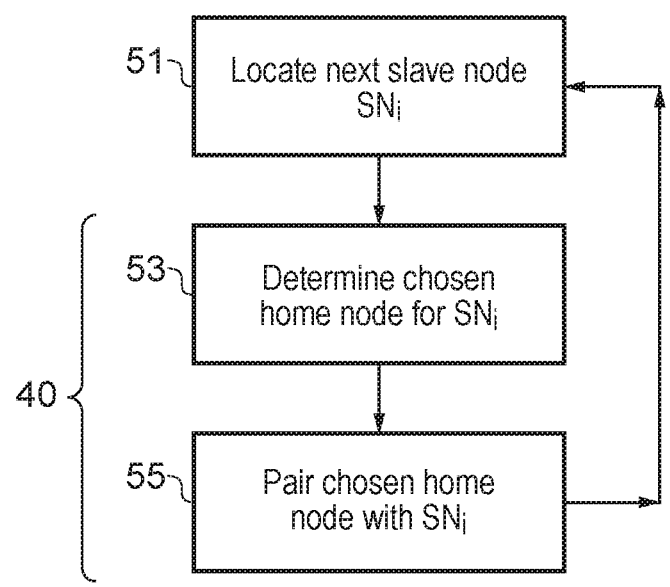
FIG. 5 is a flow diagram showing a method of implementing a runtime configuration method according to the present technique.

FIG. 5 is a flow diagram showing how the runtime configuration method 40 can be performed multiple times for multiple slave nodes 15 in the data processing system. In step 51, the next slave node 13 is located. The next slave node 15 is, in some examples, the next slave node identified by the configuration circuitry 26 performing the runtime configuration method 40 or the next closest slave node 15 to the configuration circuitry 26. In other examples, the next slave node 15 may be determined randomly, or it may be the next slave node 15 in a predetermined sequence. Any other method of selecting the next slave node 15 can also be used. In any case, once the next slave node 15 has been selected, the method proceeds to step 53, in which a chosen home node 13 is determined for the selected slave node 15, according to the runtime configuration method 40. Once a chosen home node 13 has been determined, the method proceeds to step 55, and the selected slave node 15 and the chosen home node 13 are paired. Steps 53 and 55 collectively make up the runtime configuration method 40 described in FIG. 4. Following the pairing of the slave node 15 and the chosen home node 13 in step 55, the method returns to step 51, and is repeated for the next slave node 15.

Figure 6:
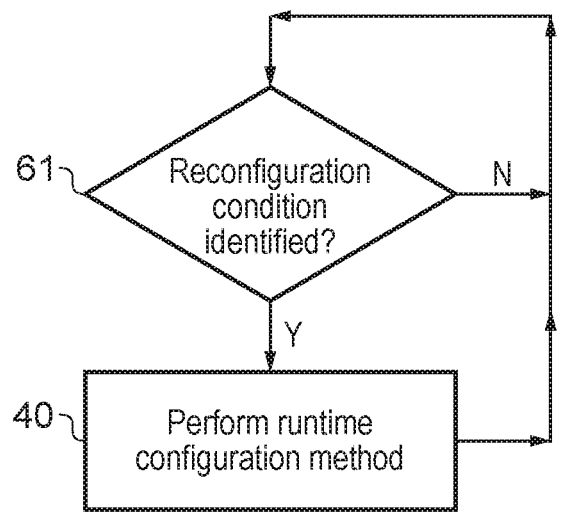
FIG. 6 is a flow diagram showing a method of implementing a runtime configuration method according to the present technique in response to a reconfiguration condition.

FIG. 6 is a flow diagram depicting the triggering of the runtime configuration method 40 by a reconfiguration condition. In step 61, a determination is made of whether a reconfiguration condition has been identified. A reconfiguration condition can be one of:

a home node 13 being disconnected—this could be that a home node 13 is powered off or physically disconnected from the system, or it may develop a fault;

a slave node 15 being disconnected—likewise, this could be that a slave node 15 is powered off or physically disconnected from the system, or it may develop a fault;

an additional slave node 15 being added to the data processing system 1;

an additional home node 13 being added to the data processing system 1; and the data processing system 1 being rebooted (e.g. powered off and powered back on again).

If it is determined in step 61 that a reconfiguration condition has not been identified, the method repeats step 61. Step 61 is repeated until a reconfiguration condition is identified. Once a reconfiguration condition has been identified, the method proceeds to step 40, in which the runtime configuration method 40 is performed. Once the runtime configuration method 40 has completed, the method returns to step 61.

In this way, the arrangement of home nodes 13 and slave nodes 15 in the data processing system 1 remains dynamic, and an efficient arrangement can be selected every time the system is reconfigured.

In brief overall summary, a data processing system and a method of runtime configuration of the data processing system are disclosed, the data processing system comprising a plurality of home nodes, and the method comprising, for a data store associated with a slave node in the data processing system, determining for each home node of the plurality of home nodes a modified size of the data store, the modified size being based on a storage capacity of the data store and at least one additional property of the data processing system. The method also comprises selecting a chosen home node of the plurality of home nodes which satisfies a minimization criterion for the modified size, and pairing the chosen home node with the slave node.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the present technique have been described in detail herein with reference to the accompanying drawings, it is to be understood that the present technique is not limited to those precise embodiments, and that various changes and modifications can be effected therein by one skilled in the art without departing from the scope and spirit of the present technique as defined by the appended claims.

We claim:

1. A method of runtime configuration of a data processing system comprising a plurality of home nodes, the method comprising:

for a data store controlled by a slave node in the data processing system, the slave node controlling memory accesses to the data store, determining for each home node of the plurality of home nodes a modified size of the data store controlled by the slave node, the modified size being based on a storage capacity of the data store and at least one additional property of the data processing system, wherein the slave node is located between the data store controlled by the slave node and the plurality of home nodes;

selecting a chosen home node of the plurality of home nodes which satisfies a minimization criterion for the modified size; and pairing the chosen home node with the slave node.

2. The method of claim 1, wherein the at least one additional property of the data processing system is a memory container defined for each of the plurality of home nodes, wherein each memory container defines a memory size which the respective home node is capable of accessing.

3. The method of claim 2, wherein a difference between the storage capacity of the data store and the memory container of each home node of the plurality of home nodes is calculated, and the modified size is further dependent on the difference.

4. The method of claim 1, wherein the at least one additional property of the data processing system comprises, for each home node of the plurality of home nodes, a number of independent transmission paths that must be taken to transmit data between the slave node and the home node.

5. The method of claim 1, wherein the at least one additional property of the data processing system comprises a quality of a link between the slave node and each home node of the plurality of home nodes.

6. The method of claim 5, further comprising determining the quality in dependence on a bandwidth of the link.

7. The method of claim 5, wherein the link comprises a token-based arbitration system, wherein a data transmission between the home node and the slave node is arbitrated in dependence on a number of tokens allocated for the home node for use of the link;

the method further comprising determining the quality in dependence on a number of tokens available for the link.

8. The method of claim 1, wherein the modified size is determined by multiplying the storage capacity of the data store by at least one factor based on the at least one property of the data processing system.

9. The method of claim 8, wherein the at least one factor is weighted depending on a predetermined relative importance of the at least one property.

10. The method of claim 1, wherein the minimization criterion is satisfied by the home node of the plurality of home nodes for which the modified size is smallest.

11. The method of claim 1, wherein to satisfy the minimization criterion a memory type of the data store must be compatible with memory access circuitry of the chosen home node.

12. The method of claim 1, further comprising:
selecting a further chosen home node of the plurality of home nodes which satisfies the minimization criterion for a further modified size, the further modified size being based on the storage capacity of the data store and at least one further additional property of the data processing system; and
pairing the further chosen home node with the slave node.

13. The method of claim 1, further comprising:
for a further data store controlled by a further slave node in the data processing system, determining for each home node of the plurality of home nodes a further modified size of the further data store, the further modified size being based on a storage capacity of the further data store and at least one additional property of the data processing system;
selecting a further chosen home node of the plurality of home nodes which satisfies a minimization criterion for the further modified size; and
pairing the further chosen home node with the further slave node.

14. The method of claim 13, wherein the further chosen home node is the chosen home node, wherein the at least one additional property of the data processing system is a memory container defined for the chosen home node, wherein the memory container defines a memory size which the chosen home node is capable of accessing,
and wherein a further difference between the memory container of the chosen home node, less the storage capacity of the data store, and the storage capacity of the further data store is calculated, and the further modified size is dependent on the further difference.

15. A data processing system comprising:
a plurality of home nodes;
a data store controlled by a slave node, wherein the slave node is arranged to control memory accesses to the data store;
runtime configuration circuitry arranged to perform a runtime configuration of the data processing system comprising:
determining for each home node of the plurality of home nodes a modified size of the data store controlled by the slave node, the modified size being based on a storage capacity of the data store and at least one additional property of the data processing system, wherein the slave node is located between the data store controlled by the slave node and the plurality of home nodes; and
selecting a chosen home node of the plurality of home nodes which satisfies a minimization criterion for the modified size and to pair the chosen home node with the slave node.

16. The data processing system of claim 15, wherein the runtime configuration circuitry is part of a processing element in the data processing system.

17. The data processing system of claim 15, wherein the runtime configuration circuitry is arranged to trigger the runtime configuration of the data processing system in response to at least one reconfiguration condition being satisfied.

18. The data processing system of claim 17, wherein the at least one reconfiguration condition comprises at least one of:
the chosen home node being disconnected;
the slave node being disconnected;
a further slave node being added to the data processing system;
a further home node being added to the plurality of home nodes; and
the data processing system being rebooted.

19. A data processing system comprising:
a plurality of home means;
data storage means controlled by slave means, wherein the slave means is arranged to control memory accesses to the data storage means;
means for performing a runtime configuration of the data processing system comprising:
means for determining for each home means of the plurality of home means a modified size of the data storage means controlled by the slave means, the modified size being based on a storage capacity of the data storage means and at least one additional property of the data processing system, wherein the slave means is located between the data store controlled by the slave means and the plurality of home means; and
means for selecting a chosen home means of the plurality of home means which satisfies a minimization criterion for the modified size and to pair the chosen home means with the slave means.

* * * * *